350-275

4/28/87 XR 4,661,856 SR

United States Patent [19]

Schnack

[11] Patent Number: 4,661,856

[45] Date of Patent: Apr. 28, 1987

[54] CATHODE RAY TUBE GLARE FILTER, RADIATION AND STATIC ELECTRICITY SUPPRESSION DEVICE

[75] Inventor: Peter G. Schnack, Santa Rosa, Calif.

[73] Assignee: Sun-Flex Company, Inc., Novato, Calif.

[21] Appl. No.: 761,755

[22] Filed: Aug. 2, 1985

[51] Int. Cl.[4] .......... H04N 5/72

[52] U.S. Cl. .......... 358/252; 358/253; 358/255; 350/276 SL; 174/35 MS

[58] Field of Search .......... 358/252, 253, 254, 255, 358/247, 245; 350/276 R, 276 SL; 174/35 MS, 35 GC; 313/461, 476, 479; 340/757

[56] References Cited

U.S. PATENT DOCUMENTS

| | | | |
|---|---|---|---|
| 3,305,623 | 2/1967 | Bakker et al. | 174/35 MS |
| 3,431,348 | 3/1969 | Nellis et al. | 174/35 GC |
| 4,246,613 | 1/1981 | Choder et al. | 358/253 |
| 4,253,737 | 3/1981 | Thomsen et al. | 358/252 |
| 4,412,255 | 10/1983 | Kuhlman | 358/252 |
| 4,514,585 | 4/1985 | Paynton | 174/35 GC |

*Primary Examiner*—Edward L. Coles, Sr.
*Attorney, Agent, or Firm*—George W. Wasson

[57] ABSTRACT

A combined glare and radiation and static electricity suppression device, for use on the face of a cathode ray tube, consisting of an opaque, conductive mesh, and a spherical frame which is preformed to the same curvature as the cathode ray tube and serves to conform the mesh to the tube and hold the device in place. The frame is painted with a conductive paint on the side where the mesh is bonded to the frame. The bonding is done using a solvent which softens the paint without affecting the conductive contact between the paint and the mesh. A grounding connection is connected to the conductive side of the frame to a grounding point on the assembly including the cathode ray tube. The mesh, when grounded, minimizes static field build-up and significantly reduces the electric component of electromagnetic radiation emanating from the cathode ray tube and passing through the front of the tube. The device is also effective to reduce glare from illumination from in front of the tube.

17 Claims, 6 Drawing Figures

CATHODE RAY TUBE GLARE FILTER, RADIATION AND STATIC ELECTRICITY SUPPRESSION DEVICE

FIELD OF THE INVENTION

This invention relates to a device for use with a cathode ray tube for the purpose of reduction of surface glare from the face of the tube and for suppressing the radiation and static electricity generated by the electronic components of a video display terminal or television set. More particularly the invention relates to a device adapted for attachment to the face of a cathode ray tube to accomplish the desired glare reduction and suppression.

BACKGROUND OF THE INVENTION

The introduction of the video display terminal has brought on a substantial change in the office, school and home environment. These new labor saving devices contain, in the most cases, a cathode ray tube as a part of a video display terminal linked to a computer.

Not very many years ago, video display terminals were used on a regular basis only by computer professionals and in limited speciality fields such as air transportation and typesetting. In the recent years the use of such display devices has experienced a rapid growth to the extent that in 1985 there are estimated to be thirteen million video display terminals in use in the United States and Canada alone. The phenomenal growth in the use of such devices has brought a parallel growth in the number of people using such devices. It is estimated that 40-50% of American workers will be making daily use of video display terminals by 1990 at more than thirty-eight million video display terminal stations in factories, schools and offices.

A growing number of children are now using video display terminals in the class room as computers become an integral part of every school program. In addition, the children have extensive use of video display terminals for recreational purposes, such as video games and home computers.

The increased use of video display terminals has several side effects that need consideration. Included in those effects are:

1. X-ray radiation is given off as a secondary emission from the impact of high speed electrons on the viewing screen.
2. Ultraviolet radiation and visible light are given off from the excitation of the phosphors on the inner surface of the screen.
3. Infrared radiation is produced from the heat generated on the viewing screen by the impact of electrons and the excitation of the phosphors.
4. Pulsating very low frequency fields (VLF) at 15-20 Khz are generated by the electrical pulses which cause the beam to go "on" and "off" eleven million times a second.
5. Radio frequencies are also generated by pulsations coming from the coordinating circuits.
6. Extremely low frequencies (ELF) of 30-60 Hz are produced from the electrical pulses which cause the beam to move vertically in order to refresh the full frame 30 to 60 times a second.
7. Static electricity is also produced as a result of electrons being ejected from the electron beam. These electrons build up on the screen and surrounding space.

During recent years, evidence of video display terminal related illnesses has surfaced and an increasing number of health complaints have been reported to the National Institute of Occupational Savety and Health (NIOSH) in the United states. The complaint rate has reached a level where video display terminal operators are number one on OSHA's complaint list. These health complaints have initiated an increase in research into the possible health effects of specifically radiation emissions from the video display terminal. The present stage of this research indicates that the health impact most likely is generated by the high levels of non-ionizing radiation emitted from video display terminals. A number of scientific studies have shown that such radiation is biologically very active and has serious adverse impact on animal embroys, as well as creating a significantly higher cancer rate in animals and humans.

It is also observed that the low level radiation and the extremely low level radiation emitted from video display termnals has a very high electric component and a much lower magnetic component.

Today, several scientists recommend shielding the video display terminals for such radiation. Among others, this includes Dr. H. D. Sharma, University of Waterloo, Toronto, Canada and Dr. Art Guy, Professor at University of Washington, Seattle, Wash., in a report to International Business Machine Corporation.

There is also a problem created by use of video display terminals in lighted areas where glare from the reflection of the surrounding lighting causes the user of the video display terminal to complain.

SUMMARY OF THE PRESENT INVENTION

The present invention is directed specifically to the problem above described and accomplishes a reduction in the glare caused by reflection from the terminal and a reduction of radiation from such video display terminals by shielding the electric components of the electromagnetic radiation.

A further object of the present invention in accord with the preceeding object is a combined glare filter and radiation and static electricity suppression device consisting of an opaque, conductive mesh, and a spherical frame performed to the same curvature as the face of a cathode ray tube on which the frame is to be applied, with the preforming of the frame serving to conform the mesh of the filter to the face of the tube and to hold the frame in place on the tube.

A further object of the present invention in accord with the preceeding object is a preformed glare and radiation suppression device that is adapted to be mounted on the face of a video display terminal in a manner to provide dependable attachment of the device to the video display terminal.

A further object of the present invention in accord with the preceeding object is to provide an economical method of manufacture of such a glare and radiation suppression device.

Another object of the present invention is a novel formation of a suppression device of the type above described that will substantially improve the attaching of the device to a video display terminal.

Further objects and features of the invention will be readily apparent to those skilled in the art from the appended drawings and specification illustrating a preferred embodiment wherein:

DETAILED DESCRIPTION OF THE INVENTION

Figure 1:
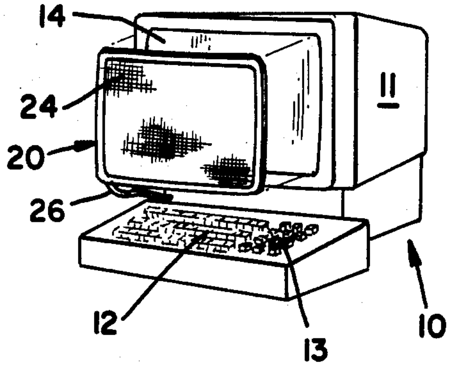
FIG. 1 is a perspective view of a typical apparatus employing a video display terminal wherein the device of the present invention would be useful.

The present invention is useful in a device such as a video display terminal, television or other device using a cathode ray tube. As illustrated in FIG. 1, a video display terminal is shown at 10 having a case 11, a keyboard 12 of the typewriter type, and set of keys 13 for functional controls. The display face of the video display terminal is a cathode ray tube 14. The device of the present invention is a screen 20 containing a mesh 24 and adapted to be mounted to the face of the cathode ray tube 14.

The present invention is directed to overcoming one or more of the problems experienced with mounting glare shielding mesh filters, as described in Canadian Pat. No. 521,316, in U.S. Pat. No. 4,253,737 and U.S. Pat. No. 4,468,702. As described in the foregoing paragraphs, there are a large number of unshielded video display terminals in use and many more such devices will be produced in the years to come before regulations are established to reduce the exposure to such hazards. The ease of mounting a glare and radiation shielding device has been a central issue because the large number of video display terminals are very hard and dangerous to disassemble. Therefore, the mounting of such a shielding device should be accomplished in a manner that will place the device on the face of the video display terminal without disassembling the video display terminal from the bezel or case of the unit. Such mounting can be carried out either by a front plate filter in a flat, stiff frame as described in the above Canadian Patent or by a filter as described in the present invention.

The disadvantage of the flat, front plate filter, as described in the Canadian Patent are that moire patterns are created between the surface of the cathode ray tube and the back side of the mesh, and the mesh is extremely vunerable to damage because of lack of support from the back. Also, the flat plate filter presents considerably increased surface shine because of the flat configuration.

The device of the present invention is designed to conform the mesh or fabric of the screen to the face of the cathode ray tube and to hold it in place by sticking the device to the face of the tube. It is also a feature of the present invention to provide a frame having the lowest possible width in cross-section to cover up a minimum view area of the vviewing face of the cathode ray tube while providing a frame that will have sufficient stiffness to maintain tension on the fabric.

The shield device described in U.S. Pat. No. 4,468,702 can be adhered directly to the glass of a cathode ray tube but the flat format of the frame makes it difficult to get full conformance to the tube face and experience has shown that the flat frame will pull the shielding device away from the tube face and, if not installed bĕhind the bezel of the cathode ray tube, the filter may fall off easily. The present invention overcomes this significant problem.

Figure 3:
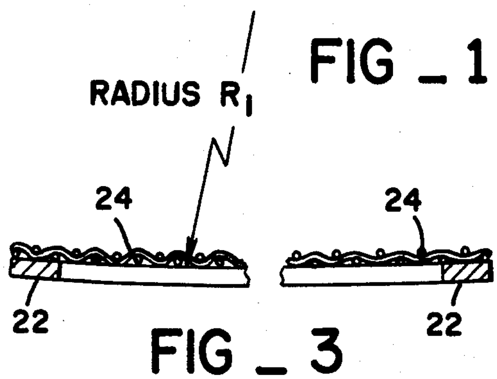
FIG. 3 is a sectional view taken along the lines 3—3 of FIG. 2.
Figure 2:
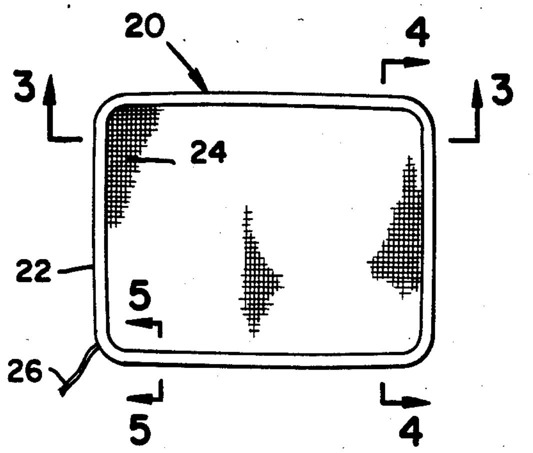
FIG. 2 is a front elevation view of the device of the present invention.
Figure 4:
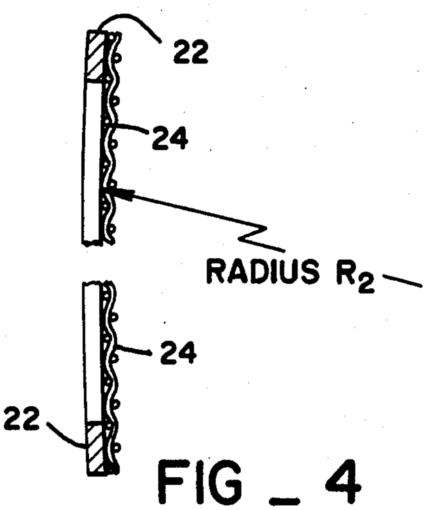
FIG. 4 is a sectional view taken along the lines 4—4 of FIG. 2.

In accord with the present invention the shield 20 comprises a frame 22 formed as a part of a spherical shape establishing a curved plane formation. The frame 22 is preformed to have the curvature of the face of a typical cathode ray tube and is produced in any of selected curvatures to conform to the conventional and commercially available display tubes. Once formed, the frame 22 is intended to maintain its preformed curvature. As illustrated in FIG. 2, the frame 22 has a rectangular perimeter configuration in the plane of its formation as if the plane of the frame was a portion of the surface of a sphere. The rectangular perimeter formation of the frame 22 establishes a top, bottom and side portions for the frame. Rectangular as used in this specification is a general term; the top and bottom and sides are not parallel with each other in a true rectangular form but are intended to enclose the face of a typical cathode ray tube. The curved plane of formation of the frame is such that the top and bottom portions have a curvature of the same radius and the side portions have another, an possibly different, radius of curvature. The radii of curvature can be the same for all portions. FIG. 3 illustrates a section through the shield of FIG. 2 along the lines 3—3 and illustrates the radius of curvature, radius $R^1$, of the frame in that axis of the frame. FIG. 4 illustrates a section through the shield of FIG. 2 along the lines 4—4 and illustrates the radius of curvature, radius $R^2$, in the other axis of the frame. The contour of the frame is to be concave with a smooth inner surface matching the convex curvature of the cathode ray tube on which it is to be mounted.

Figure 5:
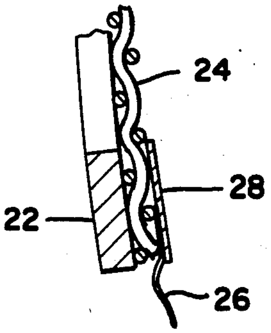
FIG. 5 is a sectional view taken along the lines 5—5 of FIG. 2.

The shield 20 as illustrated has a fabric 24 secured to the inner surface of the frame 22 in a manner to create the desired smooth inner surface on the frame. As illustrated in FIG. 5 the frame 22 has the fabric 24 secured to its inner surface and a solvent bonder is applied on the surface of the fabric and frame to establish a complete bonding of the fabric to the frame. Includable within the bonded attachment of the fabric and frame, at some point around the perimeter of the frame, is an electrical conductor 26 having a purpose to be describe hereinafter. The innermost surface of the shield device of the present invention in its assembled form is an adhesive tape 28, or other adhesive application, which may be of the double adhesive surface type permitting it to be adhesively bound to the fabric and frame at their bonded surface. The tape's other adhesive surface permits it to be used as the means for attaching the device to the face of a cathode ray tube.

The frame 22 of the present invention may be formed from a sheet of material that is preformed to the curvature of a cathode ray tube and individual frames may then be cut out of the preformed sheet. The frame may also be manufactured by an injection molding process. Typical radius of curvature for the spherical or eliptical form could be a radius of 20 to 25 inches, and in some cases as small as 17 inches, depending on the size of display tube to be covered.

The frame 22 may be produced from a plastic material or from metal. The important feature of the material selected for the frame is its ability to be formed in the desired radius of curvature and its ability to maintain substantially permanently a biasing profile that will bias the frame and its fabric into tight contact with the face of the cathode ray tube on which it is mounted. Plastic materials having such a "memory" of formation are known and metals can be formed or treated to maintain their form.

After the frame is produced, in any of the manners above and of any of the suggested materials, the inner surface of the frame 22 is painted with a conductive paint on the surface where the fabric 24 is to be installed. In a preferred method of assembly, the frame with the painted conductive surface is placed on a stretching table with the fabric stretched on the top oof the frame. The fabric is them bonded to the frame with a solvent bonder, dissolving the conductive paint and the fabric and frame, creating a permanent bond with all of the materials and the conductive paint.

Figure 6:
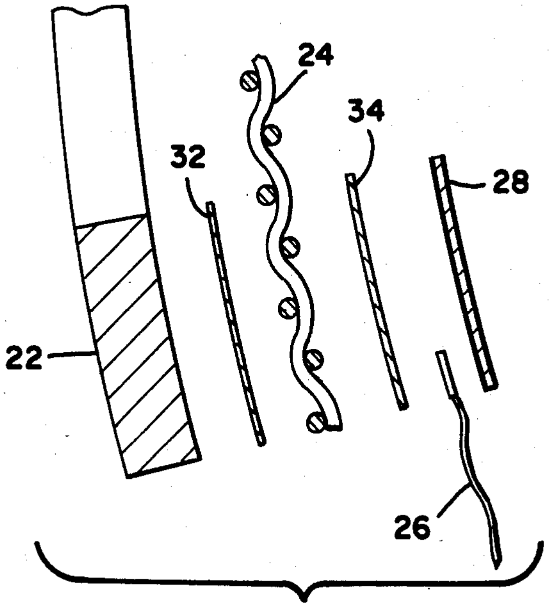
FIG. 6 is an exploded sectional view illustrating the layers formed at the frame of the present invention.

The layers of such a process of assembly are illustrated in FIG. 5 and 6 where the frame 22 is shown with the conductive paint 32 on its inner surface. The fabric or mesh 24 is bonded to the frame and painted surface by the solvent bonded 34 and the adhesive layer 28 is attached to the innermost surface. The conductive wire, when included, is shown at 26 in its position of being bonded to the fabric and frame in the assembly.

The fabric 24 is created by either weaving conductive yarn or wires in a square pattern, or by coating or impregnating a standard micromesh with a conductive material. The fibers in the fabric should have a diameter in the 30 to 80 micron range, depending upon whether the application is for color or black and white monitors. The color monitors have a finer dot pattern on the face of the cathode ray tube and therefore require a mesh designed for color displays and a more critical orientation of the fabric on the frame to comply with the dot pattern of the tube.

When a conductive mesh is installed in the frame, as described above, the grounding wire 26 is attached to the conductive side of the frame, creating a means for permanent grounding for the fabric. Grounding of the shield device with the wire 26 attached to the case or chassis of the video display device substantially minimizes the passage of radiation from the tube toward the viewer through the face of the cathode ray tube. The surface resistivity of the mesh or fabric material should be in the range of $10^{-3}$ to $10^{-4}$ ohms per unit square and the surface resistivity of the frame material after painting with a conductive paint as at 32, should be in the range of $10^{-4}$ to $10^{2}$ ohms per unit square. With such a construction the approximate attenuation should be $-40$ db for the electrical component of the electromagnetic radiation at a frequency of 1 megahertz. Such attenuation will reduce known levels of the electromagnetic field of VLF and ELF radiation far below even the most conservative safety standards.

The spherical frame as described installs directly on the face of the cathode ray tube using the thin, double-stick tape or other adhesive material 28 illustrated and mounts the frame 22 in close contact with the tube face and conforms the fabric 24 directly to the tube face. While the frame of the present invention could be mounted to the face of a display tube of a video display terminal behind the bezel, the frame of the present invention has particular application to mounting on the face of a tube in front of the bezel. The form of the frame and it contour provides for a complete contact between the fabric and the tube face and a biased contact between the frame and the tube.

The frame and fabric of the present invention have utility in reducing glare even when not intended as a radiation grounding device. Video display terminals without a covering fabric or mesh are subject to severe reflection glare from surrounding light. With a fabric on the face of the display tube that glare is reduced. It has also been shown that hand contact with the face of a video display terminal will cause the face of the tube to be marred with hand carried dirt and oils. The use of a fabric as herein disclosed tightly adhering to the face of a video display terminal will substantially reduce the marring of the face of the terminal from hand contact. The fabric is easily cleaned with maintenance products.

While a certain preferred embodiment of the invention has been specifically described and disclosed, it should be understood that the invention is not limited thereto as many variations will be readily apparent to those skilled in the art and the invention is be be given its broadest possible interpretation within the terms of the following claims.

I claim:

1. A preformed glare and radiation suppression device adapted for attachment to the face of a cathode ray tube comprising:

(a) a thin, lightweight, portable frame having a curved plane of formation and constructed of a formable material, said material being formable to produce a substantially permanently, resilient biasing profile to said frame, (b) said frame having a rectangular perimeter configuration in the plane of its formation with an inner surface and an outer surface, having top, bottom and side portions of substantially the same cross-section transverse to said frame, (c) said frame being preformed to establish a radius of curvature for said perimeter configuration in the plane of said frame for said top, bottom and side portions, (d) a fabric of conductive material stretched across the inner surface of said frame and secured to said top, bottom and side portions on the inner surface thereof to establish an inner perimeter surface of said frame having said fabric secured thereto, (e) an electrically conductive material included in said securing of said fabric to said frame to conductively bond said fabric to said frame, (f) an electrical conductor electrically connected at least to said electrically conductive material included in securing said fabric to said frame to permit electrical contact with said frame and fabric, (g) and means on said inner perimeter surface of said frame for attaching said device to said face of a cathode ray tube.

2. The device of claim 1 wherein said material for construction of said frame is a plastic material.

3. The device of claim 1 wherein said material for construction of said frame is a formable metal.

4. The device of claim 1 wherein said inner surface of said rectangular perimeter of said frame is a substantially smooth surface.

5. The device of claim 1 wherein said curved plane of formation of said frame includes a first radius of curvature for said top and bottom portions and a second radius of curvature for said side portions, said first radius of curvature being not necessarily the same radius of curvature as said second radius of curvature.

6. The device of claim 1 wherein said curved plane of formation of said frame includes a radius of curvature for said top and bottom portions having a radius not less than 17 inches.

7. The device of claim 1 wherein said curved plane of formation of said frame includes a radius of curvature for said side portions having a radius not less than 17 inches.

8. The device of claim 1 wherein said securing of said fabric to said frame substantially incorporates said fabric material into said frame material.

9. The device of claim 1 wherein said electrically conductive material included in securing said fabric to said frame includes an electrically conductive paint.

10. The device of claim 1 wherein said electrically conductive material included in securing said fabric to said frame includes a solvent bonder material for plasticizing said frame and said fabric to conductively bond said fabric to said frame.

11. The device of claim 1 wherein said electrical conductor is connected to said frame and said fabric by being incorporated in said securing of said fabric to said frame.

12. The device of claim 1 wherein said means on said inner surface of said frame for attaching said device to said face of said cathode ray tube is a tape material with adhesive material on both surfaces, one surface being in contact with said frame and the other surface being in a form for attaching said constructed device to said face of said cathode ray tube.

13. The device of claim 1 wherein said frame material with said electrically conductive material for securing said fabric to said frame produces a frame having a surface resistivity in the range of $10^{-4}$ to $10^{2}$ ohms per unit square.

14. The device of claim 1 wherein said fabric of conductive material is a fabric having a surface resistivity in the range of $10^{-3}$ to $10^{4}$ ohms per unit square.

15. The device of claim 1 wherein said assembled device comprises a frame material, a fabric material of conductive material, and a layer of electrically conductive material securing said fabric to said frame, said assembled device being attached to the face of a cathode ray tube and when attached to said cathode ray tube said assembled device has an approximate attenuation of $-40$ db for the electrical component of the electromagnetic radiation at a frequency of 1 megahertz.

16. A method for manufacturing a device for glare and radiation suppression and for use when attached to the face of a cathode ray tube comprising the steps of:

(a) from a sheet of preformed material producing a frame member with a rectangular perimeter configuration and having a concave curved plane of formation, said preformed material having a substantially permanent resilient bias in its preformed form, said preforming of said material being such as to form said material in said sheet with the radius of curvature of said sheet in the two axes of the plane of said sheet being such as to conform to the convex radius of curvature of the face of a cathode ray tube on which said device is to be used, said rectangular perimeter configuration for said frame producing a frame having top, bottom and side portions, (b) applying a conductive paint material at least to the inner concave surface of said frame to establish a conducting layer around the inner surface of said frame, (c) stretching a fabric of conductive material across the face of said rectangular frame with said fabric on the inner surface of said frame in a manner to bond said fabric to said frame and to establish an electrically conductive connection between said fabric and said frame through said paint, (c) attaching an electrical conductor to said frame by bonding said conductor to said bonded frame and fabric, (d) and applying an adhesive surface to said frame on the innermost surface of said bonded frame and fabric, said adhesive surface having an exposable adhesive surface for mounting said device to the face of a cathode ray tube.

17. A preformed device adapted for attachment to the face of a cathode ray tube comprising:

(a) a thin, lightweight, portable frame having a curved plane of formation and constructed of a formable material, said material being formable to produce a substantially permanently, resilient biasing profile to said frame, (b) said frame having a rectangle like perimeter configuration in the plane of its formation with an inner surface and an outer surface, having top, bottom and side portions of substantially the same cross-section transverse to said frame, (c) said frame being preformed to establish a radius of curvature for said perimeter configuration in the plane of said frame for said top, bottom and side portions, (d) a fabric of conductive material stretched across the inner surface of said frame and secured to said top, bottom and side portions on the inner surface thereof to establish an inner perimeter surface of said frame having said fabric secured thereto, (e) and means on said inner perimeter surface of said frame for attaching said device to said face of a cathode ray tube.

* * * * *